Patented Apr. 14, 1936

2,037,090

UNITED STATES PATENT OFFICE 2,037,090

SULPHUR PREPARATION

Francis H. Pough, St. Louis, Mo., assignor to Southern Acid and Sulphur Company, St. Louis, Mo., a corporation of Illinois No Drawing. Application January 2, 1934, Serial No. 705,031

1 Claim. (Cl. 167—20)

For many purposes, sulphur must be used in a very fine state of division. On the other hand, there is an inherent tendency for the particles of finely divided sulphur to agglomerate into pellets which impair the practical value of the sulphur and in some cases unfit it for certain uses. For instance, finely divided sulphur is valuable as a fungicide and as an insecticide and has the faculty of adhering to foliage in the form of a very thin film of sulphur dust; but if such finely divided sulphur is permitted to stand even a short time without adequate provision against agglomeration, its particles will agglomerate into pellets and these pellets because of their size and weight will not adhere to foliage and will not give the essential uniformity of covering of the unagglomerated sulphur. Likewise, in the manufacture of rubber, it is of great importance that sulphur shall be dispersed thoroughly and uniformly throughout the rubber, and, if the sulphur contains pellets, such pellets may melt during the process of mixing and, upon cooling, will form harmful, sharp, hard crystals in the body of the rubber without such crystallized sulphur doing its intended work of vulcanization.

The principal object of the present invention is to provide against the above described tendency of finely divided sulphur to agglomerate into pellets. Another object is to confer on finely divided sulphur the property of running or flowing freely. Another object is to enable sulphur to be used in the open for fungicidal and insecticidal purposes even when the atmospheric temperature may be several degrees too low for plain sulphur to be effective. Another object is to improve the sulphur by the addition thereto of carbon black which will serve advantageously as a pigment.

According to the present invention, a small quantity of carbon in an impalpably fine state of division is thoroughly mixed with finely divided sulphur. Such carbon is available in commerce under such names as "lamp black", "gas black" and "carbon black", and the term "carbon black" is hereinafter used to include all of these products.

According to the present invention, a small quantity of carbon black is thoroughly mixed with finely divided sulphur. Carbon black is an impalpably fine powder that adheres to the particles of sulphur and serves to prevent the agglomeration of sulphur particles and gives a dark color to the mixture. A small quantity of lamp black or carbon black is sufficient to produce these results. About one percent by weight of carbon black is sufficient to completely overcome the tendency of the sulphur to agglomerate into pellets and a mixture of one percent of carbon black with ninety-nine percent of ordinary ground sulphur will flow very freely and maintain its free flowing quality indefinitely. This mixture will also be very dark so that its capacity for absorbing heat from the sun rays is much greater than the capacity of sulphur alone. The fungicidal activity of plain sulphur becomes greatly reduced when the temperature falls to the neighborhood of 70° Fahrenheit, and, therefore, the heat absorbing property of the dark colored mixture makes it practicable to use such dark colored mixture for dusting orchard, field and garden plants when the temperature is several degrees lower than would be permissible for dusting them with plain sulphur.

A mixture of carbon black with sulphur is especially advantageous in the manufacture of rubber. One reason for this is that its property of flowing very freely insures the uniform distribution of the sulphur throughout the mass in the very fine particles that are best suited for chemical reaction and which completely obviate the formation of sulphur crystals during the process of vulcanization. Another reason is that the carbon black furnishes a very desirable pigment for the rubber. So long as the mixture contains enough carbon black to insure the free flowing of the sulphur, it is permissible to add more if desired for improvement of the rubber compound.

As the carbon black has three principal functions in the mixture; namely, conferring and maintaining a free flowing quality in finely divided sulphur, increasing the heat absorbing capacity thereof and improving the rubber compound, the amount used may be varied with due regard to said functions and economy. Even as small an amount by weight of carbon black as one-tenth of one percent very noticeably darkens the color, lessens the tendency of ordinary ground or otherwise finely divided sulphur to agglomerate into pellets and make it run or flow more freely. On the other hand, an excess of carbon black above that required for the accomplishment of the functions above mentioned is not harmful until the dilution becomes so excessive as to interfere mechanically with the action of the sulphur. I have found about one percent of carbon black to be quite suitable for ordinary purposes. The more finely divided the sulphur is, the better it is for the uses hereinbefore indicated but the more certain it is to agglomerate;

and with extremely finely divided sulphur, it may be desirable to use as much as two to three percent of carbon black, and even more is not objectionable. Ordinarily, however, the content of carbon black in the mixture will range from about one-quarter of one percent to about two percent of the total mixture.

As the tendency of plain sulphur to agglomerate is continuous, it is desirable to mix the carbon black therewith as soon after grinding as practicable and before agglomeration has proceeded to a substantial extent. The timely addition of the carbon black contributes to thoroughness and uniformity of mixing and avoids complications which result from agglomeration.

What I claim is:

A dusting fungicide consisting of sulphur free from pellets and finely enough divided to adhere well to foliage and containing enough carbon black to darken its color enough to make the mixture substantially more heat absorptive than ordinary sulphur, whereby said fungicide is protected against agglomeration of its particles into pellets too large to adhere to the surface of foliage and is capable of use as a fungicide at a lower temperature than sulphur alone.

FRANCIS H. POUGH.